(12) United States Patent
Hamakubo et al.

(10) Patent No.: US 11,573,367 B2
(45) Date of Patent: Feb. 7, 2023

(54) RESIN COMPOSITION AND OPTICAL FIBER

(71) Applicant: SUMITOMO ELECTRIC INDUSTRIES, LTD., Osaka (JP)

(72) Inventors: Katsushi Hamakubo, Osaka (JP); Yuya Homma, Osaka (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 291 days.

(21) Appl. No.: 16/771,056

(22) PCT Filed: Dec. 4, 2018

(86) PCT No.: PCT/JP2018/044596
§ 371 (c)(1),
(2) Date: Jun. 9, 2020

(87) PCT Pub. No.: WO2019/116967
PCT Pub. Date: Jun. 20, 2019

(65) Prior Publication Data
US 2021/0181410 A1    Jun. 17, 2021

(30) Foreign Application Priority Data

Dec. 11, 2017 (JP) .............................. JP2017-236688

(51) Int. Cl.
*G02B 6/02* (2006.01)
*C03C 25/47* (2018.01)
(Continued)

(52) U.S. Cl.
CPC ........ *G02B 6/02395* (2013.01); *C03C 25/105* (2013.01); *C03C 25/1065* (2013.01);
(Continued)

(58) Field of Classification Search
CPC ... G02B 6/02395; C03C 25/47; C03C 25/105; C03C 25/1065
See application file for complete search history.

(56) References Cited

U.S. PATENT DOCUMENTS 5,352,712 A    10/1994 Shustack
6,316,105 B1   11/2001 Khudyakov et al.
(Continued)

FOREIGN PATENT DOCUMENTS

CN    107001129 A    8/2017
JP    H04-21546 A    1/1992
(Continued)

OTHER PUBLICATIONS

Farid Khelifa et al., Effect of photo-crosslinking on the performance of silica nanoparticle-filled epoxidized acrylic copolymer coatings, J. Mater. Chem. A, 2013, 1, 10334 (Year: 2013).*
(Continued)

*Primary Examiner* — Peter Radkowski
(74) *Attorney, Agent, or Firm* — Faegre Drinker Biddle & Reath LLP

(57) ABSTRACT

A resin composition comprises a base resin containing a urethane (meth)acrylate oligomer, a monomer and a photopolymerization initiator, and a hydrophobized spherical inorganic oxide, wherein the inorganic oxide is dispersed in the resin composition and a content of the inorganic oxide is 1 to 60% by mass based on a total amount of the resin composition.

13 Claims, 1 Drawing Sheet

(51) Int. Cl.

| | |
|---|---|
| *C03C 25/105* | (2018.01) |
| *C03C 25/1065* | (2018.01) |
| *C08F 283/00* | (2006.01) |
| *C08K 3/36* | (2006.01) |
| *C08K 5/101* | (2006.01) |
| *C08K 9/04* | (2006.01) |
| *C09D 151/08* | (2006.01) |

(52) U.S. Cl.
CPC .......... *C03C 25/47* (2018.01); *C08F 283/008* (2013.01); *C08K 3/36* (2013.01); *C08K 5/101* (2013.01); *C08K 9/04* (2013.01); *C09D 151/08* (2013.01); *C08K 2201/005* (2013.01)

(56) References Cited

U.S. PATENT DOCUMENTS

| | | | |
|---|---|---|---|
| 9,925,560 | B2 * | 3/2018 | Armstrong ............... C08J 7/046 |
| 2005/0136252 | A1 | 6/2005 | Chisholm et al. |
| 2008/0045623 | A1 | 2/2008 | Yamaguchi et al. |
| 2016/0121365 | A1 * | 5/2016 | Armstrong ........... C09D 5/1693 |
| | | | 428/317.9 |
| 2017/0307815 | A1 | 10/2017 | Iwaguchi et al. |
| 2017/0368806 | A1 | 12/2017 | Shin et al. |
| 2018/0156996 | A1 | 6/2018 | Iwaguchi et al. |

FOREIGN PATENT DOCUMENTS

| | | | |
|---|---|---|---|
| JP | H06183790 A | * | 7/1994 |
| JP | H7-102186 A | | 4/1995 |
| JP | H08-59302 A | | 3/1996 |
| JP | 2000007717 A | * | 1/2000 |
| JP | 2001-089684 A | | 4/2001 |
| JP | 2006-126763 A | | 5/2006 |
| JP | 2006-161030 A | | 6/2006 |
| JP | 2007-517935 A | | 7/2007 |
| JP | 2014-219550 A | | 11/2014 |
| JP | 2016-098128 A | | 5/2016 |
| TW | 201629134 A | | 8/2016 |
| WO | WO-00/66636 A1 | | 11/2000 |
| WO | WO-2005/066287 A1 | | 7/2005 |
| WO | WO-2006/036057 A1 | | 4/2006 |
| WO | WO-2016/080829 A1 | | 5/2016 |
| WO | WO-2016/103957 A1 | | 6/2016 |
| WO | WO-2017/122589 A1 | | 7/2017 |
| WO | WO-2019/116967 A1 | | 6/2019 |

OTHER PUBLICATIONS

J. Shiue, Effects of silica nanoparticle addition to the secondary coating of dual-coated optical fibers, Acta Materialia 54 (2006) 2631-2636 (Year: 2006).*

K. A. Shashkeev, et al., "Superhydrophobic Electrically Conductive Coatings Based on a Silicone Matrix and Carbon Nanotubes," Journal of Applied Chemistry, Aug. 16, 2017, V. 90, Issue 7, pp. 896-897.

* cited by examiner

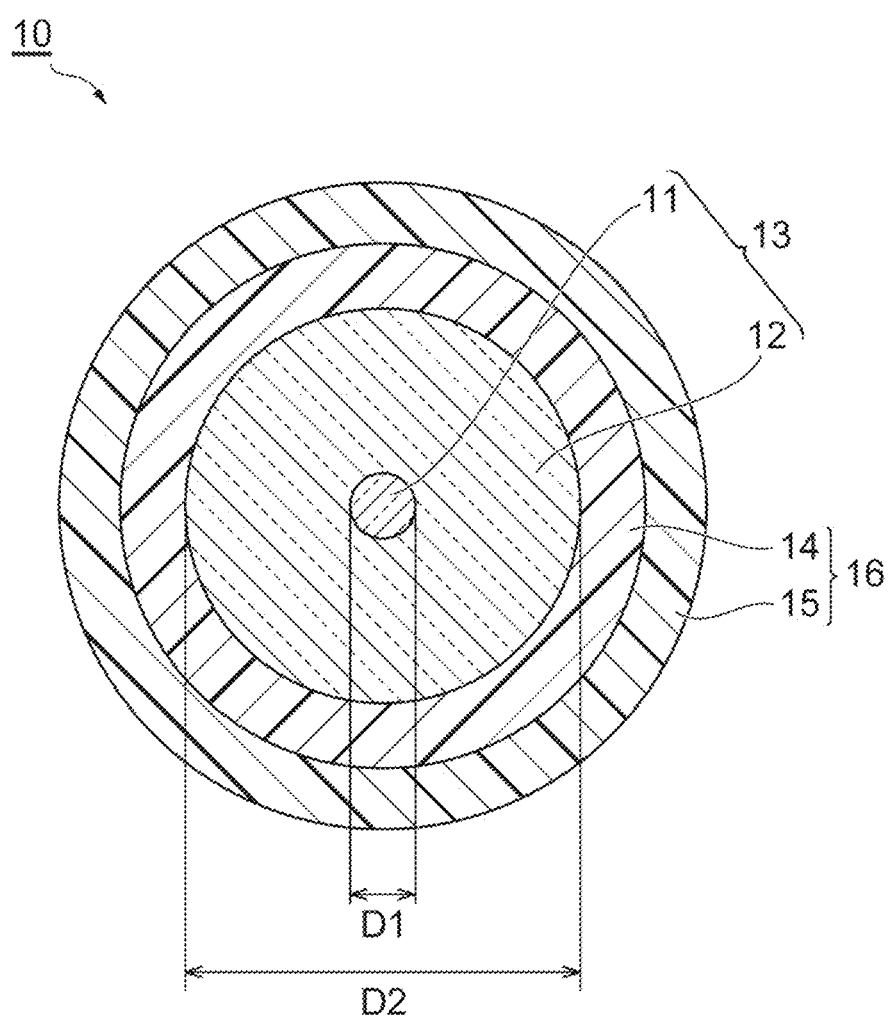

RESIN COMPOSITION AND OPTICAL FIBER

TECHNICAL FIELD

The present invention relates to a resin composition and an optical fiber.

This application claims priority based on Japanese Patent Application No. 2017-236688 filed on Dec. 11, 2017, and incorporates all the contents described in the Japanese application.

BACKGROUND ART

Generally, an optical fiber has a coating resin layer for protecting a glass fiber which is an optical transmission medium. The optical fiber has been required to have excellent lateral pressure characteristics in order to reduce an increase in transmission loss induced by micro-bend generated when lateral pressure is applied to the optical fiber.

For example, Patent Literature 1 has investigated the improvement of the lateral pressure characteristics of the optical fiber by forming a resin layer using an ultraviolet-curable resin composition containing a filler made of synthetic silica.

CITATION LIST

Patent Literature

[Patent Literature 1] JP 2014-219550 A

SUMMARY OF INVENTION

A resin composition according to one aspect of the present invention comprises a base resin containing a urethane (meth)acrylate oligomer, a monomer and a photopolymerization initiator, and a hydrophobized spherical inorganic oxide, wherein the inorganic oxide is dispersed in the resin composition and the content of the inorganic oxide is 1 to 60% by mass based on the total amount of the resin composition.

BRIEF DESCRIPTION OF DRAWINGS

FIG. 1 is a schematic cross-section diagram showing an example of the optical fiber according to the present embodiment.

DESCRIPTION OF EMBODIMENTS

Problem to be Solved by the Present Disclosure

In the case of a resin composition containing a filler, filler precipitation may reduce the storage stability of the resin composition and the filler aggregates to prevent formation of a smooth resin layer and thus a part of a resin layer may peel.

An object of the present disclosure is to provide a resin composition having an excellent storage stability, and capable of forming a smooth resin layer and preparing an optical fiber having excellent lateral pressure characteristics, and to provide an optical fiber having excellent lateral pressure characteristics.

Advantageous Effects of the Present Disclosure

The present disclosure can provide a resin composition having an excellent storage stability, and capable of forming a smooth resin layer and preparing an optical fiber having excellent lateral pressure characteristics, and can provide an optical fiber having excellent lateral pressure characteristics.

Description of Embodiment of the Present Invention

First, the contents of the embodiment of the present invention will be described by listing them. A resin composition according to one aspect of the present invention comprises a base resin containing a urethane (meth)acrylate oligomer, monomer and a photopolymerization initiator, and a hydrophobized spherical inorganic oxide, wherein the inorganic oxide is dispersed in the resin composition and the content of the inorganic oxide is 1 to 60% by mass based on the total amount of the resin composition.

The above inorganic oxide contained at a content within a certain range enables the resin composition to have an excellent storage stability to form a smooth resin layer. In addition, an optical fiber having excellent lateral pressure characteristics can be prepared by using the resin composition according to the present embodiment as an ultraviolet-curable resin composition for coating the optical fiber.

The above inorganic oxide may be at least one selected from the group consisting of silicon dioxide, zirconium dioxide, aluminum oxide, magnesium oxide, titanium oxide, tin oxide and zinc oxide because these have excellent dispersibility in the resin composition and can easily form a smooth resin layer.

From the view point of formation of a resin layer having high Young's modulus, the average primary particle diameter of the inorganic oxide may be 200 nm or less.

An optical fiber according to one aspect of the present invention comprises a glass fiber comprising a core and cladding, a primary resin layer contacting with the glass fiber and coating the glass fiber, and a secondary resin layer coating the primary resin layer, and the secondary resin layer comprises the cured product of the resin composition. Application of the resin composition according to the present embodiment to the secondary resin layer can improve the lateral pressure characteristics of the optical fiber.

Detail of Embodiment of the Present Invention

Specific examples of a resin composition and an optical fiber according to embodiments of the present invention will be described referring to the drawing as necessary. The present invention is not limited to these illustrations but is indicated by the claims and intended to include meanings equivalent to the claims and all modifications within the patent claim. In the following description, the same reference numerals are given to the same elements in the description of the drawing, and redundant explanations are omitted.

<Resin Composition>

The resin composition according to the present embodiment includes a base resin containing a urethane (meth) acrylate oligomer, a monomer and a photopolymerization initiator, and a hydrophobized spherical inorganic oxide.

(Meth)acrylate means an acrylate or a methacrylate corresponding to it. The same applies to (meth)acrylic acid.

(Inorganic Oxide)

The inorganic oxide according to the present embodiment is a spherical particle having a surface subjected to hydrophobic treatment. The inorganic oxide may be a metal oxide. The hydrophobic treatment according to the present embodiment is introduction of a hydrophobic group onto the surface of the inorganic oxide. The inorganic oxide having a hydrophobic group introduced has excellent dispersibility in the resin composition. The hydrophobic group may be a reactive group such as a (meth)acryloyl group or a non-reactive group such as a hydrocarbon group. In the case of the inorganic oxide having a reactive group, the resin layer having high Young's modulus is easy to form.

The inorganic oxide according to the present embodiment is dispersed in a dispersion medium. Using the inorganic oxide dispersed in the dispersion medium allows for uniform dispersion of the inorganic oxide in the resin composition and then improvement of the storage stability of the resin composition. The dispersion medium is not particularly limited as long as curing of the resin composition is not obstructed. The dispersion medium may be reactive or non-reactive. As the reactive dispersion medium, a monomer such as a (meth)acryloyl compound and an epoxy compound can be used. As the non-reactive dispersion medium, a ketone solvent such as methyl ethyl ketone (MEK), an alcohol solvent such as propylene glycol monomethyl ether (PGME), or an ester solvent such as propylene glycol monomethyl ether acetate (PGMEA) can be used. In the case of using the non-reactive dispersion medium, the resin composition may be prepared by mixing the base resin and the inorganic oxide dispersed in the dispersion medium and removing a part of the dispersion medium. The inorganic oxide dispersed in the non-reactive dispersion medium reduces shrinkage on curing of the resin composition more easily as compared with the inorganic oxide dispersed in the reactive dispersion medium. When the dispersion medium containing the inorganic oxide is observed with an optical microscope (about 100 times magnification) and particles are not observed, the inorganic oxide is regarded to be dispersed as the primary particle.

Examples of the (meth)acryloyl compound include 1,6-hexanediol di(meth)acrylate, EO-modified bisphenol A di(meth)acrylate, polyethylene glycol di(meth)acrylate, PO-modified bisphenol A di(meth)acrylate, polypropylene glycol di(meth)acrylate, and polytetramethylene glycol di(meth)acrylate. As the (meth)acryloyl compound, compounds exemplified by monomers described below may be used.

It is preferable that the above inorganic oxide be at least one selected from the group consisting of silicon dioxide (silica), zirconium dioxide (zirconia), aluminum oxide (alumina), magnesium oxide (magnesia), titanium oxide (titania), tin oxide, and zinc oxide because these have excellent dispersibility in the resin composition and easily form a smooth resin layer. From the view point of excellent inexpensiveness, easy surface treatment, permeability to ultraviolet ray, easy provision of a resin layer with appropriate hardness, and the like, it is more preferable that the silica subjected to surface treatment be used as the inorganic oxide according to the present embodiment.

From the view point of increasing a Young's modulus of the resin layer, the average primary particle diameter of the inorganic oxide is preferably 200 nm or less, more preferably 10 to 200 nm, and further preferably 10 to 150 nm. The average primary particle diameter can be measured with image analysis of electron microscope pictures and a light scattering method, for example. The dispersion medium in which the primary particle of the inorganic oxide is dispersed appears to be visually transparent when the diameter of the primary particle is small. When the diameter of the primary particle diameter is relatively large (40 nm or more), the dispersion medium in which the primary particle is dispersed appears to be clouded. However, the precipitate is not observed.

The content of the inorganic oxide is 1 to 60% by mass, preferably 7 to 50% by mass, more preferably 9 to 40% by mass, and further preferably 10 to 40% by mass, based on the total amount of the resin composition. The content of the inorganic oxide of 1% by mass or more allows for easy formation of the resin layer having excellent lateral pressure characteristics. When the content of the inorganic oxide is 60% by mass or less, the resin composition has excellent storage stability and can form a tough resin layer.

(Base Resin)

A base resin according to the present embodiment contains a urethane (meth)acrylate oligomer, a monomer and a photopolymerization initiator.

As the urethane (meth)acrylate oligomer, an oligomer obtained by reacting a polyol compound, a polyisocyanate compound, and a hydroxyl group-containing (meth)acrylate compound can be used.

Examples of the polyol compound include polytetramethylene glycol, polypropylene glycol and bisphenol A-ethylene oxide addition diol. Examples of the polyisocyanate compound includes 2,4-tolylene diisocyanate, 2,6-tolylene diisocyanate, isophorone diisocyanate, and dicyclohexylmethane 4,4'-diisocyanate. Examples of the hydroxyl group-containing (meth)acrylate compound include 2-hydroxyethyl (meth)acrylate, 2-hydroxybutyl (meth)acrylate, 1,6-hexanediol mono(meth)acrylate, pentaerythritol tri(meth)acrylate, 2-hydroxypropyl (meth)acrylate, and tripropylene glycol mono(meth)acrylate.

As a catalyst for synthesizing a urethane (meth)acrylate oligomer, an organotin compound is generally used. Examples of the organotin compound include dibutyltin dilaurate, dibutyltin diacetate, dibutyltin maleate, dibutyltin bis(2-ethylhexyl mercaptoacetate), dibutyltin bis(isooctyl mercaptoacetate), and dibutyltin oxide. From the view point of easy availability or catalyst performance, it is preferable that dibutyltin dilaurate or dibutyltin diacetate be used as catalyst.

When the urethane (meth)acrylate oligomer is synthesized, lower alcohols having 5 or less carbon atoms may be used. Examples of the lower alcohols include methanol, ethanol, 1-propanol, 2-propanol, 1-butanol, 2-butanol, 2-methyl-2-propanol, 1-pentanol, 2-pentanol, 3-pentanol, 2-methyl-1-butanol, 3-methyl-1-butanol, 2-methyl-2-butanol, 3-methyl-2-butanol, and 2,2-dimethyl-1-propanol.

As the monomer, a monofunctional monomer having one polymerizable group or a multifunctional monomer having two or more polymerizable groups can be used. A monomer may be used by mixing two or more monomers.

Examples of the monofunctional monomer include (meth) acrylate monomers such as methyl (meth)acrylate, ethyl (meth)acrylate, propyl (meth)acrylate, n-butyl (meth)acrylate, sec-butyl (meth)acrylate, tert-butyl (meth)acrylate, isobutyl (meth)acrylate, n-pentyl (meth)acrylate, isopentyl (meth)acrylate, hexyl (meth)acrylate, heptyl (meth)acrylate, isoamyl (meth)acrylate, 2-ethylhexyl (meth)acrylate, n-octyl (meth)acrylate, isooctyl (meth)acrylate, isodecyl (meth)acrylate, lauryl (meth)acrylate, 2-phenoxyethyl (meth)acrylate, 3-phenoxybenzyl (meth)acrylate, phenoxydiethylene glycol acrylate, phenoxypolyethylene glycol (meth)acrylate, 4-tert-butylcyclohexanol (meth)acrylate, tetrahydrofurfuryl (meth)acrylate, benzyl (meth)acrylate, dicyclopentenyl (meth)acrylate, dicyclopentenyloxyethyl (meth)acrylate, dicyclopentanyl (meth)acrylate, nonylphenol polyethylene glycol (meth)acrylate, nonylphenoxypolyethylene glycol (meth)acrylate, and isobornyl (meth)acrylate; carboxyl group containing monomers such as (meth)acrylic acid, (meth)acrylic acid dimer, carboxyethyl (meth)acrylate, carboxypentyl (meth)acrylate, and ω-carboxy-polycaprolactone (meth)acrylate; heterocycle containing (meth)acrylates such as N-(meth)acryloyl morpholine, N-vinyl pyrrolidone, N-vinyl caprolactam, N-acryloylpiperidine, N-methacryloylpiperidine, N-(meth)acryloylpyrrolidine, 3-(3-pyridine) propyl (meth)acrylate, and cyclic trimethylolpropane formal acrylate; maleimide monomers such as maleimide, N-cyclohexyl maleimide, and N-phenyl maleimide; amide monomers such as (meth)acrylamide, N, N-dimethyl (meth)acrylamide, N, N-diethyl (meth)acrylamide, N-hexyl (meth)acrylamide, N-methyl (meth)acrylamide, N-isopropyl (meth)acrylamide, N-butyl (meth)acrylamide, N-methylol (meth)acrylamide, and N-methylolpropane (meth)acrylamide; aminoalkyl (meth)acrylate monomers such as aminoethyl (meth)acrylate, aminopropyl (meth)acrylate, N, N-dimethylaminoethyl (meth)acrylate, and tert-butylaminoethyl (meth)acrylate; and succinimide monomers such as N-(meth)acryloyloxymethylene succinimide, N-(meth)acryloyl-6-oxyhexamethylene succinimide, and N-(meth)acryloyl-8-oxyoctamethylene succinimide.

Examples of the multifunctional monomer include ethylene glycol di(meth)acrylate, polyethylene glycol di(meth)acrylate, polypropylene glycol di(meth)acrylate, neopentyl glycol di(meth)acrylate, tripropylene glycol di(meth)acrylate, di(meth)acrylate of alkylene oxide adduct of bisphenol A, tetraethylene glycol di(meth)acrylate, hydroxypivalic acid neopentyl glycol di(meth)acrylate, 1,4-butanediol di(meth)acrylate, 1,6-hexanediol di(meth)acrylate, 1,9-nonanediol di(meth)acrylate, 1,12-dodecanediol di(meth)acrylate, 1,14-tetradecanediol di(meth)acrylate, 1,16-hexadecanediol di(meth)acrylate, 1,20-eicosanediol di(meth)acrylate, isopentyl diol di(meth)acrylate, 3-ethyl-1, 8-octanediol di(meth)acrylate, EO adduct of bisphenol A di(meth)acrylate, trimethylol propane tri(meth)acrylate, trimethylol octane tri(meth)acrylate, trimethylol propane polyethoxy tri(meth)acrylate, trimethylol propane polypropoxy tri(meth)acrylate, trimethylol propane polyethoxy polypropoxy tri(meth)acrylate, tris[(meth)acryloyloxyethyl] isocyanurate, pentaerythritol tri(meth)acrylate, pentaerythritol polyethoxy tetra(meth)acrylate, pentaerythritol polypropoxy tetra(meth)acrylate, pentaerythritol tetra(meth)acrylate, ditrimethylol propane tetra(meth)acrylate, dipentaerythritol tetra(meth)acrylate, dipentaerythritol penta(meth)acrylate, dipentaerythritol hexa(meth)acrylate, and caprolactone-modified tris[(meth)acryloyloxyethyl] isocyanurate.

The photopolymerization initiator can be appropriately selected from known radical photopolymerization initiators and used. Examples of the photopolymerization initiator include 1-hydroxycyclohexyl phenyl ketone, 2,2-dimethoxy-2-phenylacetophenone, 1-(4-isopropylphenyl)-2-hydroxy-2-methylpropan-1-one, bis(2,6-dimethoxybenzoyl)-2,4,4-trimethylpentylphosphine oxide, 2-methyl-1-[4-(methylthio)phenyl]-2-morpholino-propan-1-one (Omnirad 907 manufactured by IGM Resins), 2,4,6-trimethylbenzoyl-diphenylphosphine oxide (Omnirad TPO manufactured by IGM Resins), and bis(2,4,6-trimethylbenzoyl) phenylphosphine oxide (Omnirad 819, manufactured by IGM Resins).

The resin composition may further contain a silane coupling agent, a photoacid generator, a leveling agent, an antifoaming agent, and an antioxidant.

The silane coupling agent is not particularly limited as long as it does not disturb curing of the resin composition. Examples of the silane coupling agent include tetramethyl silicate, tetraethyl silicate, mercaptopropyl trimethoxysilane, vinyltrichlorosilane, vinyltriethoxysilane, vinyltris(β-methoxy-ethoxy)silane, β-(3,4-epoxycyclohexyl)-ethyltrimethoxysilane, dimethoxydimethylsilane, diethoxydimethylsilane, 3-acryloxypropyltrimethoxysilane, γ-glycidoxypropyltrimethoxysilane, γ-glycidoxypropylmethyldiethoxysilane, γ-methacryloxypropyltrimethoxysilane, N-(β-aminoethyl)-γ-aminopropyltrimethoxysilane, N-(β-aminoethyl)-γ-aminopropyltrimethyldimethoxysilane, N-phenyl-γ-aminopropyltrimethoxysilane, γ-chloropropyltrimethoxysilane, γ-mercaptopropyltrimethoxysilane, γ-aminopropyltrimethoxysilane, bis-[3-(triethoxysilyl)propyl]tetrasulfide, bis-[3-(triethoxysilyl)propyl]disulfide, γ-trimethoxysilylpropyldimethylthiocarbamyl tetrasulfide, and γ-trimethoxysilylpropyl benzothiazyl tetrasulfide.

As the photoacid generator, an onium salt having an $A^+B^-$ structure may be used. Examples of the photoacid generator include sulfonium salts such as UVACURE 1590 (manufactured by Daicel-Cytec), CPI-100P, 110P (San-Apro Ltd.) and iodonium salts such as Omnicat 250 (manufactured by IGM Regins), WPI-113 (manufactured by FUJIFILM Wako Pure Chemical Corporation), Rp-2074 (manufactured by Rhodia Japan Ltd.).

<Optical Fiber>

FIG. 1 is a schematic cross-section diagram showing an example of the optical fiber according to the present embodiment. The optical fiber 10 comprises the glass fiber 13 including the core 11 and the cladding 12, and the coating resin layer 16 including the primary resin layer 14 provided on the outer periphery of the glass fiber 13 and the secondary resin layer 15.

The cladding 12 surrounds the core 11. The core 11 and the cladding 12 mainly include glass such as silica glass, germanium-added silica can be used, for example, in the core 11, and pure silica or fluorine-added silica can be used in the cladding 12.

In FIG. 1, for example, the outside diameter (D2) of the glass fiber 13 is about 125 μm, and the diameter (D1) of the core 11 constituting the glass fiber 13 is about 7 to 15 μm.

The thickness of the coating resin layer 16 is typically about 60 to 70 μm. The thickness of each of the primary resin layer 14 and the secondary resin layer 15 may be about 10 to 50 μm, and for example, the thickness of the primary resin layer 14 may be 35 μm and the thickness of the secondary resin layer 15 may be 25 μm. The outside diameter of the optical fiber 10 may be about 245 to 265 μm.

The resin composition according to the present embodiment can be applied to the secondary resin layer. The secondary resin layer can be formed by curing a resin composition including the above base resin and inorganic oxide. Accordingly, the lateral pressure characteristics of the optical fiber can be improved.

The Young's modulus of the secondary resin layer is preferably 1300 MPa or more at 23° C., more preferably 1300 to 2600 MPa, and further preferably 1300 to 2500 MPa. The Young's modulus of the secondary resin layer of 1300 MPa or more is easy to improve the lateral pressure characteristics, and the Young's modulus of 2600 MPa or less is hard to cause a crack or the like in the secondary resin layer due to provision of appropriate toughness with the secondary resin layer.

The inorganic oxide dispersed in the dispersion medium remains to be dispersed in the resin layer even after curing of the resin layer. When reactive dispersion medium is used, the inorganic oxide is mixed together with the dispersion medium into the resin layer and is incorporated in the resin layer with the dispersion condition maintained. When non-reactive dispersion medium is used, at least a part of the dispersion medium evaporates and disappears from the resin composition. However, the inorganic oxide remains in the resin composition with the dispersion condition remained and is also present in the postcure resin layer with the dispersion condition remained. Electron microscopic observation shows that the primary particle of the inorganic oxide present in the resin layer is dispersed.

The primary resin layer 14 can be formed by curing a resin composition including a urethane (meth)acrylate oligomer, a monomer, a photopolymerization initiator and a silane coupling agent. Prior art techniques can be used for a resin composition for the primary resin layer. A urethane (meth)acrylate oligomer, a monomer, a photopolymerization initiator and a silane coupling agent may be appropriately selected from compounds exemplified in the above base resin. The resin composition constituting the primary resin layer has composition different from the base resin forming the secondary resin layer.

EXAMPLES

Hereinafter, the results of evaluation test using Examples and Comparative Examples according to the present invention will be shown, and the present invention is described in more detail. The present invention is not limited to these examples.

(Base Resin)

50 parts by mass of a urethane acrylate oligomer obtained by reacting polypropylene glycol having a molecular weight of 1000, 2,4-tolylene diisocyanate and hydroxyethyl acrylate, 28 parts by mass of epoxy acrylate, 20 parts by mass of isobornyl acrylate, and 2 parts by mass of 2,4,6-trimethylbenzoyldiphenylphosphine oxide were mixed to prepare a base resin.

Preparation of Resin Composition

Example 1

As an inorganic oxide, hydrophobic spherical silica particles (average primary particle diameter: 100 to 200 nm) dispersed in 1,6-hexanediol diacrylate (HDDA) and having a reactive group (methacryloyl group) were used. A resin composition was prepared by mixing the silica particles with a base resin so that the content of the silica particles in the resin composition was 30% by mass.

Example 2

As the inorganic oxide, hydrophobic spherical silica particles (average primary particle diameter: 70 to 100 nm) dispersed in methyl ethyl ketone (MEK) and having a reactive group were used. After mixing the base resin and the silica particles, the majority of MEK was removed under reduced pressure to prepare a resin composition so that the content of the silica particles in the resin composition was 30% by mass. The content of MEK in the resin composition was 1% by mass or less.

Example 3

A resin composition was prepared in the same manner as in Example 2 except that hydrophobic spherical silica particles (average primary particle diameter: 40 to 60 nm) dispersed in MEK and having a reactive group were used as the inorganic oxide.

Example 4

A resin composition was prepared in the same manner as in Example 2 except that hydrophobic spherical silica particles (average primary particle diameter: 10 to 15 nm) dispersed in MEK and having a reactive group were used as the inorganic oxide.

Example 5

A resin composition was prepared in the same manner as in Example 2 except that hydrophobic spherical silica particles (average primary particle diameter: 10 to 15 nm) dispersed in MEK and having no reactive group (non-reactive) were used as the inorganic oxide.

Example 6

A resin composition was prepared in the same manner as in Example 4 except that the silica particles were mixed with a base resin so that the content of the silica particles in the resin composition was 1% by mass.

Comparative Example 1

Powdery (amorphous) hydrophilic silica particles (synthetic silica glass soot, average primary particle diameter: 500 nm) were used as the inorganic oxide and mixed with a base resin to prepare a resin composition so that the content of the silica particles in the resin composition was 10% by mass.

Comparative Example 2

A resin composition was prepared in the same manner as in Comparative Example 1 except that powdery (spherical) hydrophobic silica particles (average primary particle diameter: 110 nm) having no reactive group were used as the inorganic oxide. These silica particles were aggregates of a plurality of primary particles.

Comparative Example 3

A resin composition was prepared in the same manner as in Comparative Example 1 except that powdery (spherical) hydrophobic silica particles (average primary particle diameter: 300 nm) having no reactive group were used as the inorganic oxide. These silica particles were aggregates of a plurality of primary particles.

Comparative Example 4

A resin composition was prepared in the same manner as in Comparative Example 1 except that hydrophilic spherical silica particles (average primary particle diameter: 10 to 15 nm) dispersed in methanol (MeOH) were used as the inorganic oxide. The obtained resin composition was highly viscous and clouded and could not be subjected to evaluation.

Comparative Example 5

A resin composition was prepared in the same manner as in Example 4 except that the silica particles were mixed with a base resin so that the content of the silica particles in the resin composition was 0.5% by mass.

Comparative Example 6

A resin composition was prepared in the same manner as in Example 4 except that the silica particles were mixed with a base resin so that the content of the silica particles in the resin composition was 61% by mass.

Comparative Example 7

A base resin was used as a resin composition.

The following evaluation was conducted using the resin compositions obtained in Examples and Comparative Examples. The results are shown in Tables 1 and 2.

(Secondary Particles in Resin Composition)

When a resin composition was observed with an optical microscope (100 magnification) and particles were observed, secondary particles (aggregated primary particles) were judged to be present.

(Stability of Resin Composition)

Each of the resin compositions obtained in Examples and Comparative Examples was stirred while heating at 45° C. for 30 minutes and then allowed to stand at room temperature for 1 hour and the appearance was visually confirmed.

[Preparation of Resin Film]

Each of the resin composition obtained in Examples or Comparative Examples was applied onto a polyethylene terephthalate (PET) film by using a spin coater, and then cured using an electrodeless UV lamp system "VPS 600 (D bulb)" manufactured by Heraeus at a condition of 1000±100 mJ/cm$^2$ to form a resin layer having a thickness of 200±20 µm on the PET film. The resin layer was peeled off from the PET film to obtain a resin film.

(Surface Condition of Resin Layer)

The surface condition of the formed resin layer was visually observed. In Tables 1 and 2, "Aggregate" indicates that aggregates (fine points) which are considered to be derived from the inorganic oxide were observed. "Crack" indicates that cracks were observed. "Smooth" indicates that neither aggregates nor cracks were observed and smooth surface was observed.

(Young's Modulus)

A resin film was punched into a dumbbell shape of JIS K 7127 type 5 and pulled under a condition of 23±2° C. and 50±10% RH using a tensile tester at a tension speed of 1 mm/min and a gauge length of 25 mm, and a stress-strain curve was obtained. Young's modulus was determined by 2.5% secant line.

[Preparation of Optical Fiber]

A resin composition A1 was obtained by mixing 75 parts by mass of a urethane acrylate oligomer obtained by reacting polypropylene glycol having a molecular weight of 2000, 2,4-tolylene diisocyanate, and hydroxyethyl acrylate; 12 parts by mass of nonylphenol EO-modified acrylate; 6 parts by mass of N-vinyl caprolactam; 2 parts by mass of 1,6-hexanediol diacrylate; 1 part by mass of 2,4,6-trimethylbenzoyldiphenylphosphine oxide (Omnirad TPO); and 1 part by mass of 3-mercaptopropyltrimethoxysilane (MPTS).

A primary resin layer having a thickness of 35 µm was formed on the outer periphery of a glass fiber having a diameter of 125 µm and composed of the core and the cladding by using the resin composition A1, each of the resin composition prepared in Examples or Comparative Examples was further applied onto the outer periphery of the primary resin layer to form a secondary resin layer having a thickness of 25 µm, and an optical fiber having a diameter of 245 µm was obtained. The linear speed was set at 1500 m/min.

(Lateral Pressure Characteristics)

The transmission loss of light having a wavelength of 1550 nm when the optical fiber 10 was wound into a single layer onto a bobbin with its surface covered with sandpaper and having a diameter of 280 mm was measured by an OTDR (Optical Time Domain Reflectometer) method. In addition, the transmission loss of light having a wavelength of 1550 nm when the optical fiber 10 was wound into a single layer on a bobbin having a diameter of 280 mm without sandpaper was measured by the OTDR method. Difference in the measured transmission loss was obtained and the lateral pressure characteristics was judged to be "OK" when the transmission loss difference was 0.6 dB/km or less, and the lateral pressure characteristics was judged to be "NG" when the transmission loss difference was over 0.6 dB/km. In Comparative Example 6, cracks occurred in the resin layer when the optical fiber was wound around the bobbin, and the lateral pressure characteristics could not be evaluated.

TABLE 1

| Example | 1 | 2 | 3 | 4 | 5 | 6 |
|---|---|---|---|---|---|---|
| Dispersion medium | HDDA | MEK | MEK | MEK | MEK | MEK |
| Surface condition | Hydrophobic (reactive) | Hydrophobic (reactive) | Hydrophobic (reactive) | Hydrophobic (reactive) | Hydrophobic (non-reactive) | Hydrophobic (reactive) |
| Shape | Spherical | Spherical | Spherical | Spherical | Spherical | Spherical |
| Average primary particle diameter (nm) | 100-200 | 70-100 | 40-60 | 10-15 | 10-15 | 10-15 |
| Silica content (%) | 30 | 30 | 30 | 30 | 30 | 1 |
| Secondary particle | Absent | Absent | Absent | Absent | Absent | Absent |
| Resin composition stability | Uniform | Uniform | Uniform | Uniform | Uniform | Uniform |
| Surface condition of resin layer | Smooth | Smooth | Smooth | Smooth | Smooth | Smooth |
| Young's modulus (MPa) | 1500 | 1750 | 1800 | 1950 | 1700 | 1300 |
| Lateral pressure characteristics | OK | OK | OK | OK | OK | OK |

TABLE 2

| Comparative Example | 1 | 2 | 3 | 4 | 5 | 6 | 7 |
|---|---|---|---|---|---|---|---|
| Dispersion medium | — | — | — | MeOH | MEK | MEK | — |
| Surface condition | Hydrophilic | Hydrophobic (non-reactive) | Hydrophobic (non-reactive) | Hydrophilic | Hydrophobic (reactive) | Hydrophobic (reactive) | — |
| Shape | Amorphous | Spherical | Spherical | Spherical | Spherical | Spherical | — |
| Average primary particle diameter (nm) | 500 | 110 | 300 | 100 | 10-15 | 10-15 | — |
| Silica content (% by mass) | 10 | 10 | 10 | 10 | 0.5 | 61 | — |
| Secondary particle | Present | Present | Present | Absent | Absent | Absent | — |
| Resin composition stability | Precipitate | Precipitate | Precipitate | Precipitate | Uniform | Uniform | Uniform |
| Surface condition of resin layer | Aggregate | Aggregate | Aggregate | — | Smooth | Crack | Smooth |
| Young's modulus (MPa) | 1100 | 1150 | 1170 | — | 1150 | 2750 | 1100 |
| Lateral pressure characteristics | NG | NG | NG | — | NG | — | NG |

It could be confirmed that the resin compositions in Examples have excellent storage stability and could form a smooth resin layer, and could prepare an optical fiber having excellent lateral pressure characteristics.

REFERENCE SIGNS LIST

10: optical fiber, 11: core, 12: cladding, 13: glass fiber, 14: primary resin layer, 15: secondary resin layer 16: coating resin layer.

The invention claimed is:

1. A resin composition comprising:
   a base resin containing a urethane (meth)acrylate oligomer, a monomer and a photopolymerization initiator; and
   a hydrophobized spherical inorganic oxide,
   wherein the inorganic oxide is dispersed in the resin composition and a content of the inorganic oxide is 10 to 60% by mass based on a total amount of the resin composition.

2. The resin composition according to claim 1, wherein the inorganic oxide is at least one selected from the group consisting of silicon dioxide, zirconium dioxide, aluminum oxide, magnesium oxide, titanium oxide, tin oxide, and zinc oxide.

3. The resin composition according to claim 1, wherein an average primary particle diameter of the inorganic oxide is 200 nm or less.

4. An optical fiber comprising:
   a glass fiber comprising a core and cladding;
   a primary resin layer contacting with the glass fiber and coating the glass fiber; and
   a secondary resin layer coating the primary resin layer,
   wherein the secondary resin layer comprises a cured product of the resin composition according to claim 1.

5. The optical fiber according to claim 4, wherein a Young's modulus of the secondary resin layer is 1300 to 2600 MPa at 23° C.

6. The resin composition according to claim 2, wherein an average primary particle diameter of the inorganic oxide is 200 nm or less.

7. An optical fiber comprising:
   a glass fiber comprising a core and cladding;
   a primary resin layer contacting with the glass fiber and coating the glass fiber; and
   a secondary resin layer coating the primary resin layer,
   wherein the secondary resin layer comprises a cured product of the resin composition according to claim 2.

8. An optical fiber comprising:
   a glass fiber comprising a core and cladding;
   a primary resin layer contacting with the glass fiber and coating the glass fiber; and
   a secondary resin layer coating the primary resin layer,
   wherein the secondary resin layer comprises a cured product of the resin composition according to claim 3.

9. An optical fiber comprising:
   a glass fiber comprising a core and cladding;
   a primary resin layer contacting with the glass fiber and coating the glass fiber; and
   a secondary resin layer coating the primary resin layer,
   wherein the secondary resin layer comprises a cured product of the resin composition according to claim 6.

10. The optical fiber according to claim 7, wherein a Young's modulus of the secondary resin layer is 1300 to 2600 MPa at 23° C.

11. The optical fiber according to claim 8, wherein a Young's modulus of the secondary resin layer is 1300 to 2600 MPa at 23° C.

12. The optical fiber according to claim 9, wherein a Young's modulus of the secondary resin layer is 1300 to 2600 MPa at 23° C.

13. The resin composition according to claim 1, wherein the inorganic oxide has a (meth)acryloyl group as a hydrophobic group.

* * * * *